INVENTOR
RUDOLF NÄGELE
BY Nolte and Nolte
ATTORNEYS

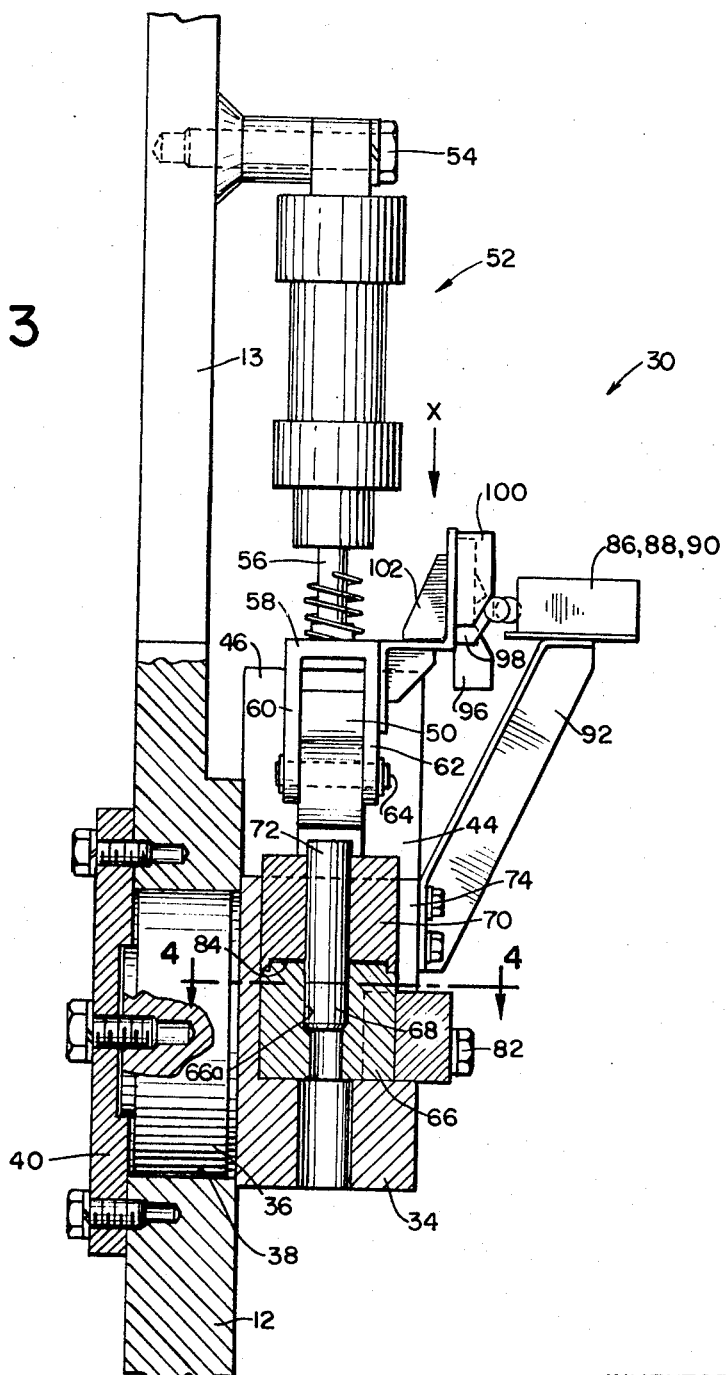

INVENTOR
RUDOLF NÄGELE

BY Nolte and Nolte
ATTORNEYS

United States Patent Office 3,452,618
Patented July 1, 1969

3,452,618
SAFETY DEVICE FOR MACHINE TOOLS
Rudolf Nägele, Weissenstein, Wurttemberg, Germany, assignor to May-Pressenbau G.m.b.H., Schwabisch-Gmund, Germany
Filed Nov. 18, 1966, Ser. No. 595,384
Claims priority, application Germany, Mar. 26, 1966, M 68,934
Int. Cl. G05g 25/00
U.S. Cl. 74—612                    8 Claims

ABSTRACT OF THE DISCLOSURE

An adjustable rocking lever is disposed on the frame of a press between a stop member integral with the press ram and a punch member which is guided against a deformable body located within an extension die. When the rocking lever is adjusted to a protective position in the range of movement of the stop member, the impact energy of the ram is transmitted to and absorbed by subsequent deformation of said deformable body in said extrusion die whereby the resulting extrusion process and, therefore, the energy transformation is well mathematically definable.

---

The present invention relates to a safety device for machine tools with rectilinearly movable or reciprocable working members, in particular to a safety device for mechanical presses.

Prior art generally provides a safety device for machine tools with rectilinearly movable or reciprocable working members, especially for mechanical presses, in order to prevent an unintended and unexpected working stroke of the working member, i.e., in connection with presses, a post-stroke of the ram. This safety device is to assure that the operator, when using the press in single stroke operation in quick succession, may bring his hands within the working range of the machine tool without running the risk of an accident on account of an unintended post-stroke of the machine.

For machine tools, especially for presses, having a relatively large stored energy, one uses customarily safety devices which are provided with a stop driven in synchronism with the working member. A safety member is arranged in the range of movement of this stop, which member, in the state of rest, is in a safety or blocking position, subsequently, when the machine tool is switched on, moves into a release or non-blocking position, and which, in the final phase of this movement, operates a switch in the circuit of the switching elements for starting the machine.

The safety member, if remaining in its blocking position, will act upon a deformation element for absorbing the shock energy whenever an unscheduled passage of the working member occurs. For this deformation element, a piece of metal is used, especially copper, which is deformed when hit by the safety member while the potential and/or kinetic energy is destroyed or absorbed during this deformation. Safety devices of the aforedescribed type have been employed successfully by the assignee of this application.

However, the deformation leads to a high compression of the material of the deformation element so that it is not possible to determine the exact deformation path and deformation force. Hence, it is difficult to dimension the elements of such safety devices. The main drawback of such known safety devices consists, however, in that this type of deformation of the deformation element may result in a fracture of and damage to the driving elements of the machine tool involved.

It is, therefore, an object of the present invention to provide a safety device for machine tools, especially for presses, with rectilinearly moving or reciprocating working members, which will overcome the above-mentioned drawbacks.

It is another object to provide a safety device of the character set forth in the preceding paragraph, which will make it possible to exactly define and determine the deformation path and deformation force; which will make it possible to dimension the members of the safety device in conformity with the force caused by the deformation and which will make it possible so to design and dimension the machine tool that damage to the elements of the machine tool and especially to the drive train will be prevented.

Still another object of the invention consists in the provision of a new method of absorbing the kinetic and potential energy of a working member of a machine tool in case of an unintended stroke of the working member.

These and other objects of the invention will appear more clearly from the following specification in connection with the accompanying drawing, in which:

FIG. 3 shows partly in view and partly in section the safety device of the invention as seen in the direction of the arrow A of FIG. 2;

According to the present invention the objects have been realized by providing a matrix or die for the accommodation of the deformation element of the safety device. A predetermined deformation can be achieved by extrusion of the deformation element under the impact or action of the safety member when acted upon by the stop driven in synchronism with the working member. Hence, the present invention makes possible an aimed, precise and predetermined deformation of the deformation element which requires a constant and predictable deformation force.

For this purpose, the die or matrix can be designed in such a way, that the material of the deformation element which is to be deformed will flow either in or counter to the direction of movement of the safety member. In a preferred embodiment, this matrix or die forms a stretching tool.

It is advantageous to provide the machine with a switch in the circuit of the starting elements of the machine, which switch will be actuated by the safety member, preferably already at the beginning of the deformation of the deformable body. By means of such a switch, the circuit for the machine drive can be interrupted immediately, if the working member or ram performs an undesired stroke so that the driving mechanism is not subjected to any additional loads when the working member is suddenly blocked.

Figure 1:
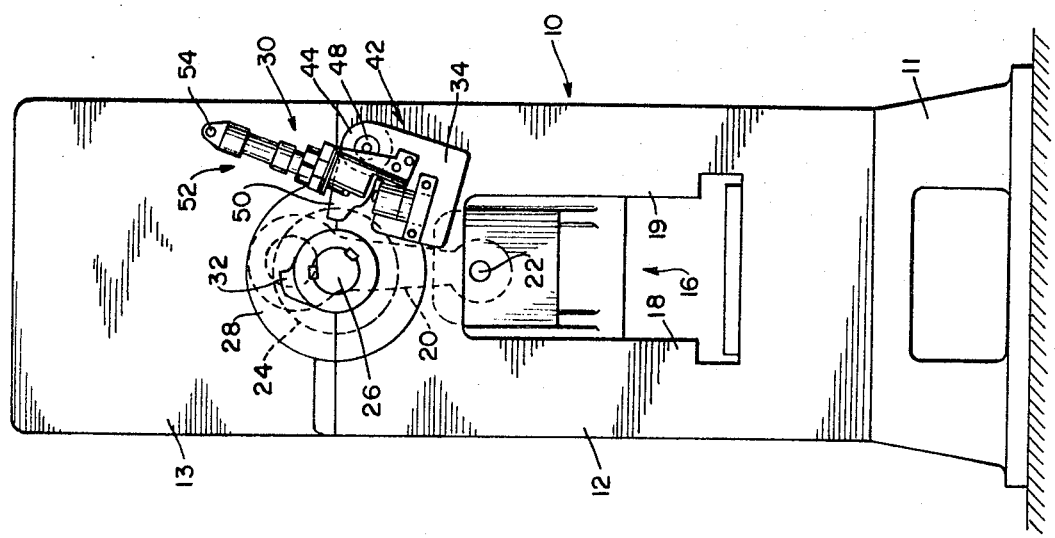
FIG. 1 is a front view of an eccentric press equipped with a safety device according to the invention.
Figure 4:
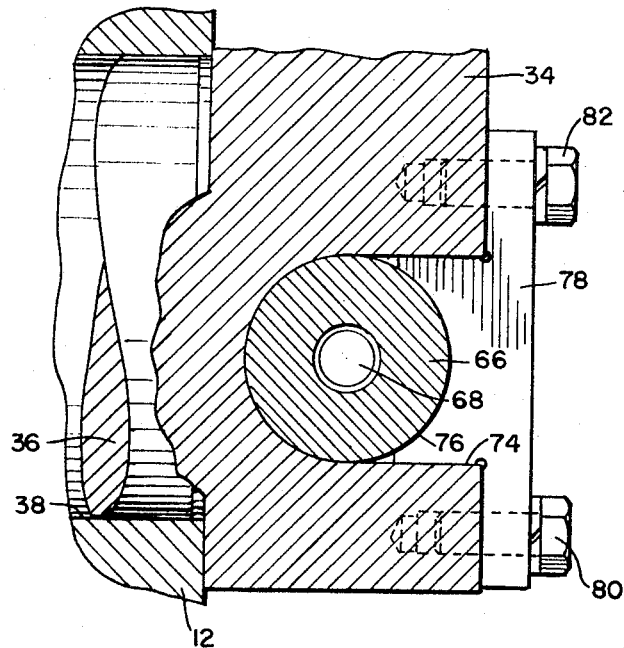
FIG. 4 is a section taken along the line 4—4 of FIG. 3 on a larger scale than FIG. 3.

Referring now to the drawing in detail, the eccentric press shown in FIG. 1 comprises a press frame 10 with a bottom part 11, two side parts 12 (only one being shown) and an upper part 13. Each of the side parts 12, which are arranged one behind the other, is provided with a pair of guideways 18, 19, spaced from each other and facing each other. A ram 16 is movably arranged on these two pairs of guideways 18, 19 by means of a connecting rod 20 journalled in the central portion of the working ram at 22. It is, of course, also possible to provide two spaced connecting rods which will engage the ram on opposite sides. A crank shaft 24 for supporting connecting rod 20 is journalled with its end portions 26 in radial bearings 28.

In order to prevent the ram, when working with individual strokes from post-striking, i.e., from a further unintended stroke following the working stroke, shaft 24 has associated therewith a safety device 30, in conformity with the invention. In case of a failure of the electric control of the press, of the pneumatic control of the control valve for the couplings and the brake, of the machine tool, of the brake itself, or a combination of such failures, working ram 16 is blocked automatically through the intervention of this safety device 30 so that the press operator, who has to bring his hands into the working range of the press ram in order to insert work pieces when operating the press with individual strokes, will be protected from damage to his hands. For this purpose, a stop or protrusion 32 has been formed onto the circumference of shaft 24, which protrusion will act upon a safety member of safety device 30 upon rotation of shaft 24, if one or several of the afore-mentioned control failures occurs. This action will block shaft 24, and thereby brake working ram 16.

It is to be understood that the stop may be mounted on a crankshaft, on an eccentric shaft or on a cam shaft which effects the movement of the working member. The stop may also be mounted directly onto the working member, for example, onto the slide-bar or ram of a press, or may be attached to a shaft which runs synchronously with the number of the downward strokes of the working member and which is in gear with the drive of the latter.

The above-mentioned safety or blocking member may act on the deformation element either directly or indirectly. In a preferred construction, this safety member is designed as a rocking lever while a punch-like transmission member is guided along a straight line in a guide member and is arranged between said rocking lever and the matrix or die, and while said transmission member cooperates positively with a part of this rocking lever. Upon impact of the stop on the safety member, the rocking lever is moved into its working or operating position so that the transmission member, which performs the function of a punch, may effect the deformation of the deformation element. The matrix and the guide for the transmission member can be accommodated in a part of the machine structure. However, a considerably more favorable construction is achieved if the matrix and guide member are exchangeably mounted in a receiving body which, in turn, is arranged exchangeably in the machine structure or frame. The rocking lever, which forms the safety member, is in this instance seated in a bearing head of said receiving body so that the entire safety device forms one single, self-contained structural unit.

The safety member itself may be controlled magnetically or by fluid under pressure, and may carry or support actuating elements for switching on at least two switches which are arranged stationarily, preferably at the receiving body.

Referring again to the drawing, according to FIGS. 2 and 3, safety device 30 comprises a receiving body 34 which is fixedly held adjacent to shaft 24, in a recess 38 of one of the side parts 12, preferably by means of an integral cylindrical connecting piece 36 and which can be clamped tight in said side part 12 by means of a clamping plate 40. Body 34 comprises a bearing head 42 formed by two spaced bearing shanks 44 and 46 between which a rocking lever 50 is rotatably journalled on a swivel shaft 48. Rocking lever 50 forms a safety member of the safety device and can be moved from a safety or blocking position (shown in FIGS. 1 and 2 in full lines) to a release or non-blocking position, shown in dot dash lines in FIG. 2, by means of a control device 52.

Control device 52 is formed according to the embodiment shown in FIG. 3, by a compressed-air operable cylinder piston system which is pivotally connected to machine frame 10 at 54. The piston rod 56 of cylinder piston system 52 carries a U-shaped follower 58, the shanks 60, 62 of which straddle rocking lever 50, the latter being tiltably mounted on said shanks by means of a bolt 64 passing therethrough. The length of rocking lever 50 is such that, in the safety or blocking position, its free end extends into the range of movement of stop 32 of shaft 24, so that in case of a post-stroke of the machine, blocking of the ram can be initiated by said rocking lever 50.

A matrix 66, which can be removed or exchanged, is arranged in body 34 below rocking lever 50, and serves for accommodating a deformation element 68 for instance, of copper or another deformable metal. A guide member 70 is mounted coaxially to matrix 66, and is arranged between the latter and rocking lever 50. Guide member 70 has slidably arranged therein a transmission member 72 acting as a push rod and partly extending into the recess 66a in matrix 66 for the deformation element 68.

According to one aspect of the invention, guide member 70 and matrix 66 form, in combination, a cold-extrusion die or, preferably, a stretching tool. The latter is arranged in a recess 74 of body 34, which recess is open on one side while the width of the opening of the recess equals at least the diameter of the cylindrical guide member and the cylindrical matrix so that the same may be inserted into body 34 from the side.

For supporting the guide member and the matrix or die, a clamping piece 78 with a substantially semi-circular portion 76 is provided, which can be inserted into the laterally open part of recess 74 and which can be clamped tight onto body 34 by means of screws 80 and 82. FIG. 3 indicates that clamping pieces 78 clamps and tightens only matrix 66 onto body 34, whereas guide member 70 is placed onto a cylindrical extension 84 of matrix or die 66. This prevents canting of parts 66 and 70 and wedging or jamming of the transmission piece 72. After the deformation of deformation element 68 has taken place, the deformation tool may be removed or withdrawn laterally from the receiving body after loosening screws 80, 82 of clamping piece 78 so that the safety device can be reloaded or replaced in a minimum of time after the same has responded, and the machine is again ready to be operated.

Figure 5:
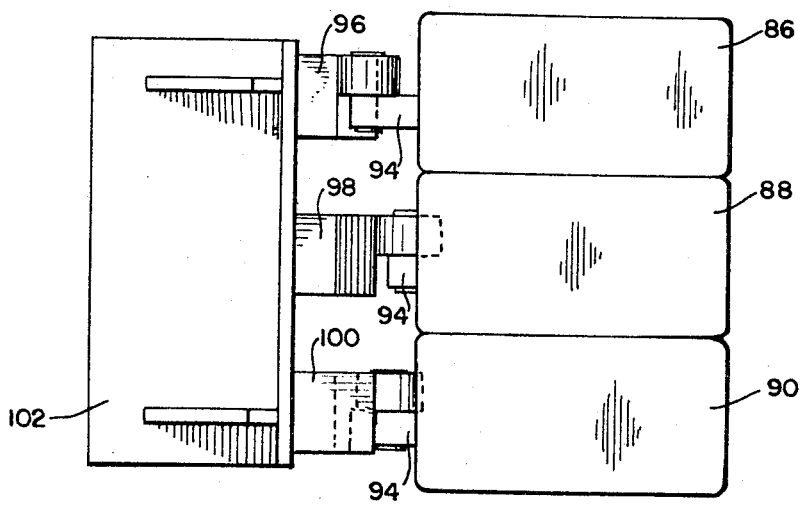
FIG. 5 is a plan view of the switch arrangement of the safety device as seen in the direction of the arrow X of FIG. 3 and shown on a larger scale than in FIG. 3.

At least two, but preferably three electro-switches 86, 88, 90 (see FIG. 5) are fixedly connected to body 34 by means of a support or holder 92 screwed onto body 34. The switching members of these switches, which are preferably formed by roller shafts 94, have associated therewith switching cams 96, 98, 100, respectively. These switching cams, which, in the safety or blocking position, or in the upper or lower end position of the rocking lever 50, either close or interrupt current circuits, are fixed or fastened to follower 58 of control device 52 by means of a bracket 102, i.e., they change their position whenever the rocking lever 50 is adjusted, and thus effect an actuation of the various switches.

Figure 2:
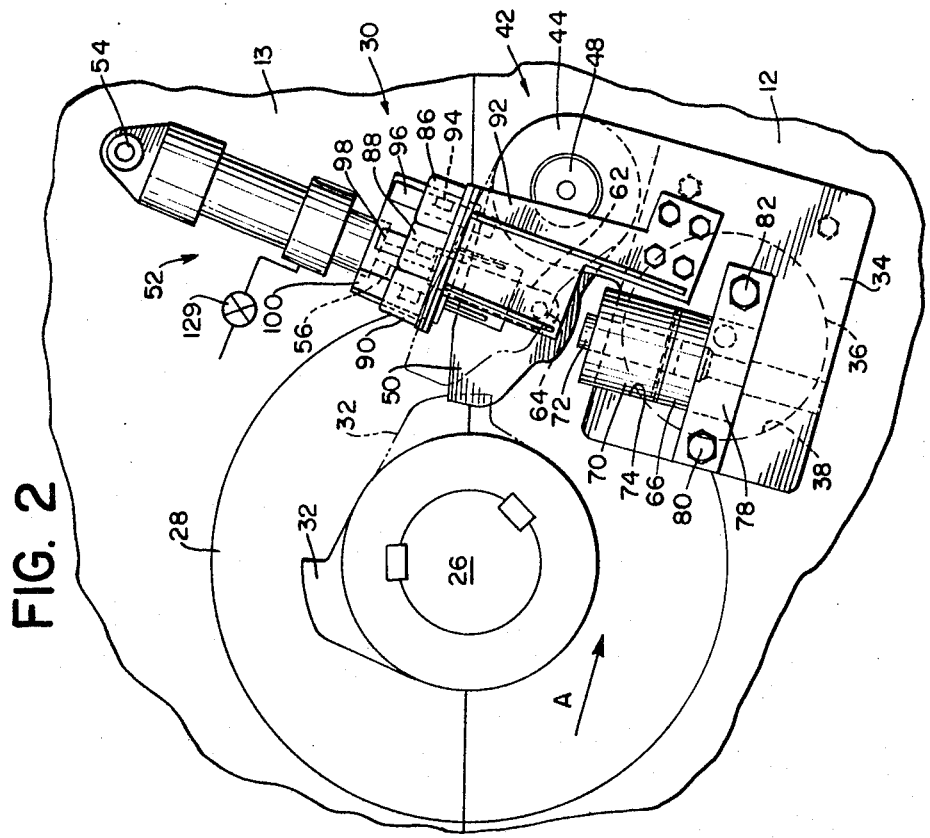
FIG. 2 shows a portion of FIG. 1 on a considerably larger scale than FIG. 1.

If the eccentric press works in single-stroke operation, the safety member which is formed by rocking lever 50 is in its blocking position shown in FIGS. 1 and 2, i.e., in a position in which it protrudes with its free end into the range of movement of stop 32. In this position, for example, the central switch 88 is operated by the switching cam 98, and closes a control circuit. Rocking lever 50 moves to its safety position also if a power failure occurs, or if the machine control is switched off. If the machine is switched to single-stroke operation, for example, this circuit, which is closed in this position via switch 88, can switch on the control device 52 if the operating buttons are pressed. Control device 52 then rotates rocking lever 50 to its release position which is indicated in dot-dash lines in FIG. 2. In the final phase of this rotating movement, during which the switching cams are moved upwardly (FIG. 3), switching cam 96 will engage the switch member of switch 86, which, in turn, will close a circuit for engaging or starting the machine. When ram 16 has reached its lower dead center position, an additional switching device (FIG. 6), which is controlled by the drive of the machine will actuate control device 52, so that rocking lever 50 is returned to its safety or blocking position according to FIG. 2. Under normal operating conditions, the machine will come to a stop in its upper dead center position. This is also obvious from the relative position of stop 32 to safety member 50 (see FIG. 2).

If, however, for example, the electric or pneumatic control of a brake or of a coupling would fail, working ram 16 would perform another, unintended stroke without interruption, i.e., it would re-strike and cause an accident if the operator were exchanging work pieces. However, on account of the fact that safety member 50 is in its blocking position, before shaft 24 will reach its lower dead center position, nose 32 will impact upon safety member 50 which in turn will hit transmission member 72 guided in guide means 70 and performing the function of a punch, so that the deformation element 68 arranged in matrix or die 66, for example a copper bolt, will be extruded.

The deformation of element 68 takes place under a constant and definite deformation force that can be determined on the basis of the ratio of the diameters in die 66 above and below the seat of element 68.

This deformation force remains essentially constant over the length of the path required for the extrusion of element 68 so that breakage of the driving elements, for example of shaft 24, the connecting rod 20 or of the gears of the press will be prevented. This is due to the fact that the deformation effected according to the invention, makes it possible to dimension the driving elements in conformity with the predictable deformation force and in conformity with the extreme loads to which these driving elements will be subjected. Finally, also each single element of the safety device can be calculated precisely on the basis of the deformation force.

The circuit for the drive of the machine can be switched off by means of switching cam 100 via switch 90 when safety member 50 is lowered by stop 32, so that the drive is not subjected to any further load or stress if the working ram is blocked. At the same time the machine control is locked electrically so that any further starting of the machine will be made impossible, until the machine tool is again in proper working condition, including the safety device with die and deformable body.

Figure 6:
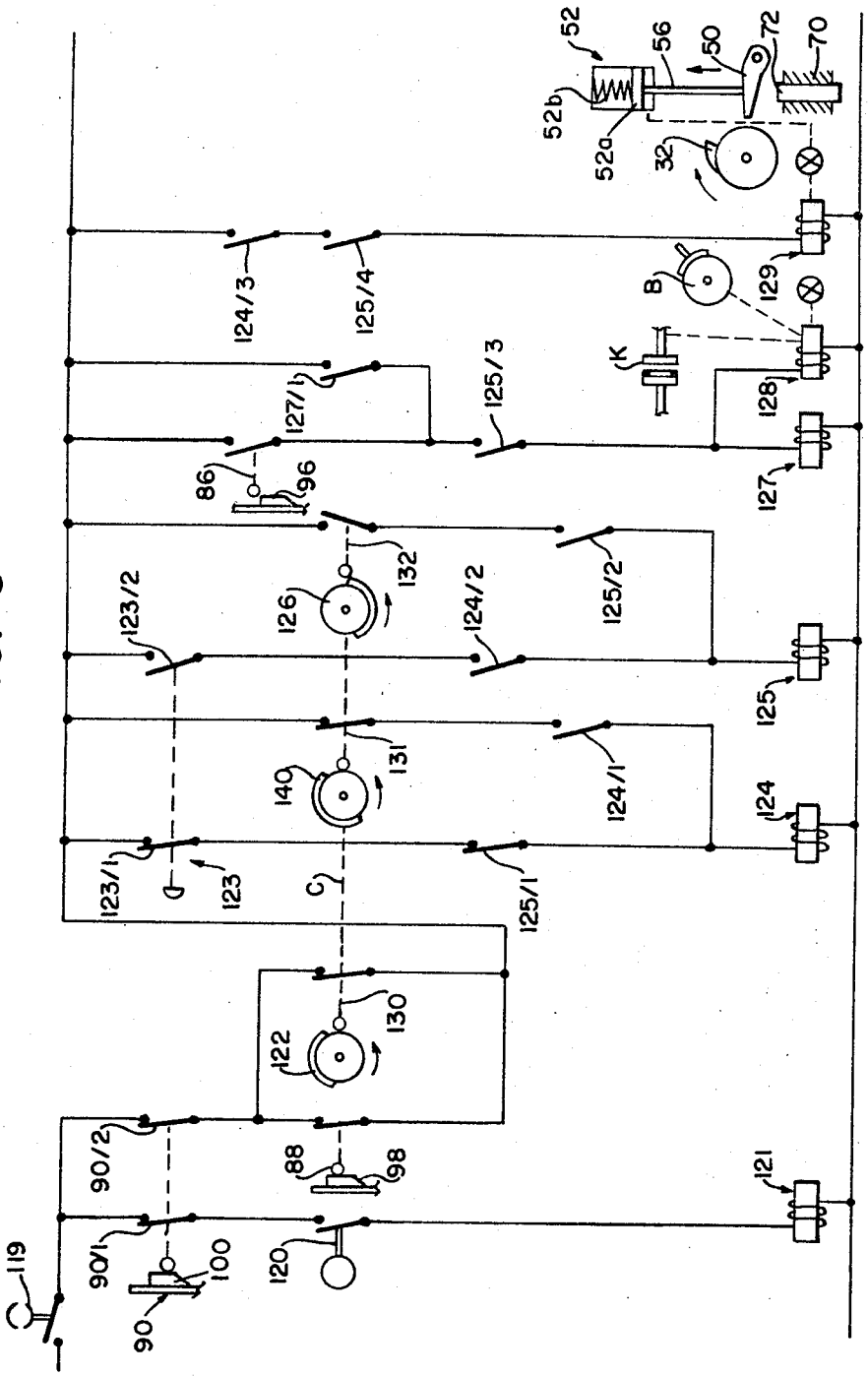
FIG. 6 diagrammatically illustrates the control circuit for the machine tool including the safety device.

A simplified diagrammatic control circuit of the eccentric press including the safety device of the invention, is shown in FIG. 6.

Limit switch 86 is open in its resting position, i.e., if or whenever rocking lever 50 is in its blocking position. Switch 86 is closed by its cam 96 whenever said rocking lever 50 is in its top or releasing position. Limit switch 88 is closed in its resting position while rocking lever 50 is in its safety or blocking position. It is opened by its cam 98 whenever said safety or rocking lever is in its top or releasing position. Limit switch 90 is closed in its resting position, and is opened when cam 32 impacts upon lever 50, i.e., whenever lever 50 moves into the lowermost end position during which deformation element 68 is being deformed. Limit switch 90 comprises two opening contacts which are designated with the symbols 90/1 and 90/2.

The upward and downward movement of safety lever 50 is effected, as described before, by a pressure medium operated aggregate or cylinder-piston system 52 which is controlled by a valve 129. Another pressure-medium valve 128 communicates with couplings and brakes of the machine.

FIG. 6 also shows a number of relays 121, 124, 125, 127 with corresponding indicating contacts. A starting switch 123, which is operated manually and which comprises an opening and a closing contact, serves for switching on the machine.

The press is equipped with a control device, generally designated C, which is rotated together with push rod 20, and which is provided with a number of cam disks operating switches by way of corresponding cams. Three of such disks, which rotate jointly and which are arranged one after the other, are indicated by symbols 122, 140 and 126. These disks act on switches 130, 131 and 132 respectively.

The mode of operation of the control circuit according to FIG. 6 is as follows: If a key switch 119 is closed manually by a key, the driving motor (not shown) of the press can be switched on via relay 121, after motor switch 120 has been switched on, so that the motor will now run constantly. Simultaneously relay 124 is being actuated and prepares the switching-on of the press by closing contacts 124/1, 124/2 and 124/3.

During the above phase of the operation, safety lever 50 is in its blocking position, since the magnetic coil of magnetic valve 129 has not as yet been energized.

For operating the press, i.e., for coupling the constantly rotating motor with the connecting or push rod 20, "on"-switch 123 must be operated by hand, so that contact 123/1 will open and contact 123/2 will close. By closing contact 123/2, relay 125 will be energized by way of the closed contact 124/2, and thereby contacts 125/2, 125/3, 125/4 will be closed, whereas contact 125/1 will be opened.

By closing contact 125/4, the coil of magnetic valve 129 will be energized whereupon the rocking lever 50 is moved to its release position in upward direction by actuation of pressure-medium aggregate 52. During the final phase of this upward movement, limit switch 86 is closed by its corresponding cam 96. In this way, relay 127 and, at the same time, the magnetic coil of magnetic valve 128 is energized, with said coil acting on a coupling K and on a brake B in such a way that coupling K is being engaged and brake B is released. It is only now that push rod 20 can move and can thus only now effect a synchronous operation of the control disks 122, 140 and 126 in the direction of the arrows shown. Before reaching the lower dead center position, the cam of control disk 140 opens limit switch 131, so that the self-locking action of relay 124 is interrupted. This brings about that the contacts 124/1, 124/2, and 124/3 will return to their open resting positions. In this way, the coil of magnetic valve 129 is de-energized, whereby the pressure which acts on the piston of pressure-operated aggregate 52 is relieved so that the piston 52a moves to its bottom position under the influence of a spring 52b thereby returning rocking lever 50 to its blocking position.

After rocking lever 50 has reached this blocking position, limit switch 88 is brought into the illustrated closed position by cam 98, the latter being controlled by rocking lever 50. It should be mentioned that this limit switch 88 is opened if rocking lever 50 is in its release position, i.e., cam 98 does not act on this limit switch.

Throughout the major portion of the upwardly directed return stroke of the ram 16, limit switch 130 is kept open by the cam of control disk 122. In this way, the proper closing of switch 88 is controlled. If this switch 88 would be open due to failure while limit switch 130 is in open position, the entire circuit for the drive of the ram would be interrupted, and the ram would be braked and stopped.

Control disk 126 serves for switching off ram 16 when the latter is in its upper dead center position. Upon engagement of the corresponding cam, limit switch 132 is opened for this purpose, and the press is thus switched off in its upper dead center position.

If the ram does not come to a stop in its upper dead center position on account of some failure in the press, for example on account of a failure of the coupling K of magnetic valve 129 or on account of a failure of limit switch 132 or of the corresponding control disk 126, stop 32 impacts upon rocking lever 50 which remains at its lower or blocking position, whereupon a coresponding deformation of the deformation element 68 occurs. In this instance, rocking lever 50 occupies its lowermost position which is somewhat below its normal blocking position shown in FIG. 2. While rocking lever 50 performs this deformation stroke, limit switch 90 together with its two opening contacts 90/1 and 90/2 will be opened. Relay 121 will be de-energized, and the main driving motor will thus be switched off. By opening contact 90/2, the entire control circuit is de-energized. This brings about releasing of the coupling and a closing of the brake in order to bring ram 16 to an immediate stop.

What is claimed is:

1. In a machine tool, having a reciprocal working member and stop means operatively coupled with said reciprocable working member, a combination of said machine tool with a safety device for preventing an undesired stroke of said working member comprising: die means having a cavity for receiving a deformable body therein and also having passage means extending from said cavity, guide means mounted on said die means, a punch member guided in said guide means for abuttment with said deformable body, movable actuating means operatively disposed for actuating said punch member, and control means for moving said actuating means into a rest position outside the range of movement of said stop means during normal operation of said machine tool and into a blocking position within the range of movement of said stop means during standstill of and in response to a failure in said machine tool, said actuating means being operable upon engagement with said stop means to transmit kinetic energy from said working member to said punch member which causes energy absorption by deformation of the deformable body received in said cavity and by extrusion of material of said body from said cavity into said passage means whereby the energy transforming extrusion process is well definable by calculation.

2. In a machine tool according to claim 1, wherein said actuating means is a rocking lever pivotally supported in said safety device.

3. In a machine tool according to claim 1, which includes means for receiving said die means and said guide means and adapted to be exchangeably mounted in said machine tool.

4. In a machine tool according to claim 3, wherein said actuating means is pivotally mounted in said receiving means, wherein said control means is formed by a pneumatically operated system, switch means mounted in said receiving means and including a first and second switch for respectively initiating and stopping movement of said working member, and means for actuating said first switch upon movement of said actuating means into said rest position and for actuating said second switch in response to said actuating means moving into said blocking position.

5. In a machine tool according to claim 4, in which said switch means are connected to said receiving means.

6. In a machine tool according to claim 3, wherein said die means and said guide means form cylindrical bodies having the same outer diameter, wherein said receiving means is provided with a cavity for receiving said die and guide means and is open laterally for lateral insertion of said die and guide means and withdrawal therefrom of said receiving means, and means for holding said die and guide means in said cavity of said receiving means.

7. In a machine tool according to claim 6, wherein said die and guide means are provided with coacting means for maintaining their relative positions.

8. In a machine tool according to claim 1, which includes switch means for initiating stopping movement of said working member in response to said actuating means moving from said blocking position towards said deformable body deforming position.

References Cited
UNITED STATES PATENTS 3,333,447    8/1967    Alspaugh _____ 100—53 X MILTON KAUFMAN, *Primary Examiner.*

U.S. Cl. X.R.

83—526; 100—53